Dec. 28, 1943.  H. JONES  2,337,663
TOOL HOLDER
Filed Sept. 30, 1942
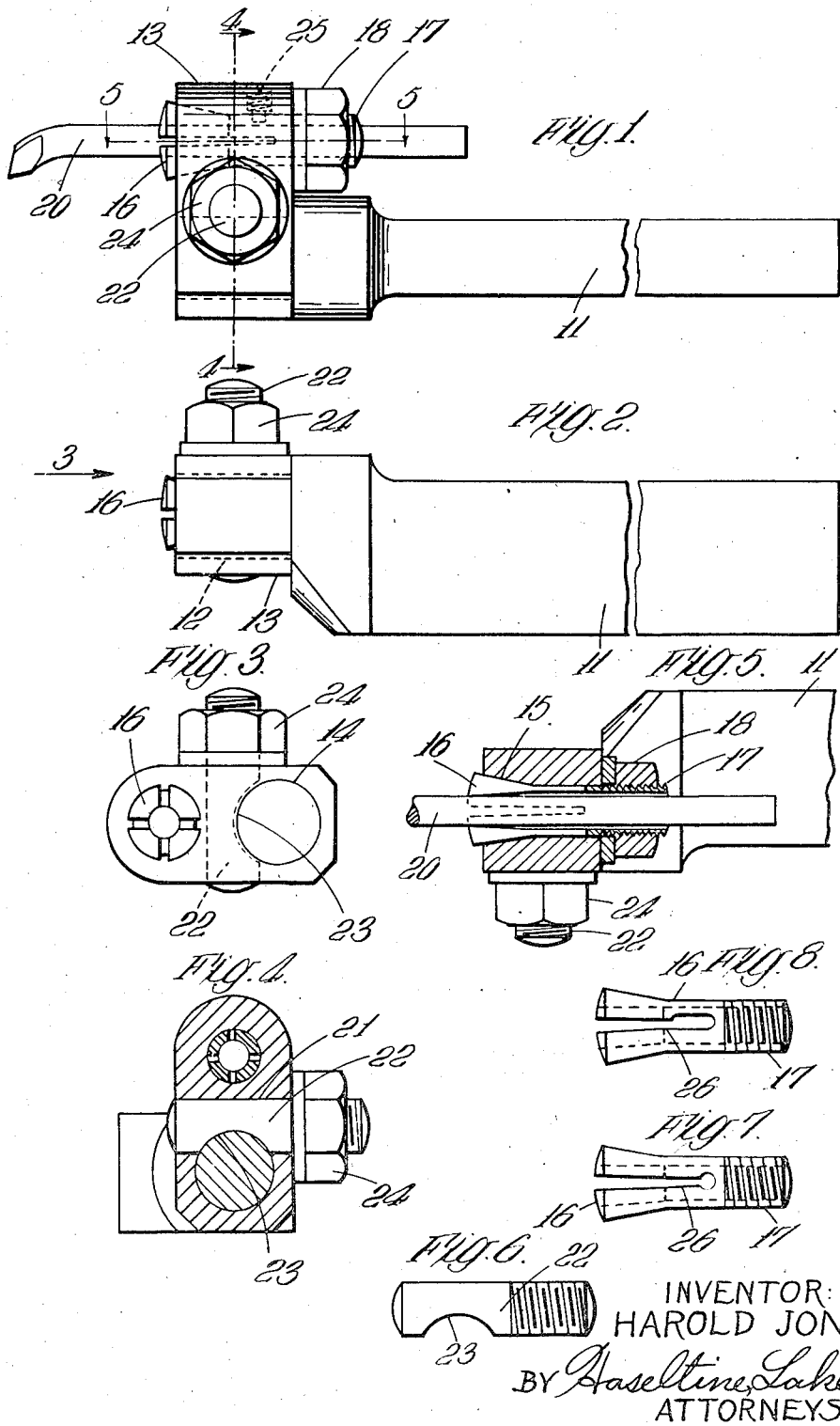
INVENTOR:
HAROLD JONES
BY Haseltine, Lake & Co.
ATTORNEYS.

Patented Dec. 28, 1943

2,337,663

UNITED STATES PATENT OFFICE 2,337,663

TOOL HOLDER

Harold Jones, Stanmore, England

Application September 30, 1942, Serial No. 460,185
In Great Britain October 21, 1941

1 Claim. (Cl. 29—98)

This invention relates to tool-holders for lathes, its chief object being to enable a cutting tool held therein to be very finely adjusted in cutting tool height and angle. In this invention it is desired to effect a very fine adjustment of the cutting tool edge in relation to the lathe centres axis, and particularly when having attained this to effect an adjustment to the tool whereby the front cutting rake of the tool may be adjusted to the correct clearance. Moreover, when the foregone requirements are obtained, it is desired to keep the base of the tool parallel to the upper surface of the lathe bed. Therefore, in order to fulfil this condition inclination of the tool-holder body is not to be permitted in either upward or downward direction.

In existing tool-holders it has been suggested to hold the tool in an offset head, which is bored to receive the tool or tool-bar, and provided with a slit through one side of the head which is closed on the tool by means of a set bolt, thus clamping the tool or tool-bar in position. In this type of tool-holder no provision is made for loss of tool height caused by successive grinding of the tool point; it becomes necessary, therefore, to resort to packing shims of one form or another, and if this is not carried out, loss of tool height prevails with consequent loss of correct front rake of the tool point.

In other known tool-holders, horizontal or radial and height adjustment of the cutting tool is obtained by the use of a screwed bush or an eccentric adjustable bush clamped in the tool-holder head. It is obvious that in these types of tool-holders any slackening of the clamping screw for the removal of the tool destroys both horizontal and height adjustment of the tool.

In my invention the various necessary adjustments may be made independently; this condition evidently gives a saving of time in re-setting a tool withdrawn for grinding.

In order that the invention may be clearly understood, it will now be further described with reference to the accompanying drawing, which illustrates an exemplification of the invention:

Figure 1 represents in plan the tool-holder with a tool fitted therein; Figure 2 shows in elevation the tool-holder in normal working position, without the tool; Figure 3 is a view of the tool head only, taken in the direction of the arrow 3 in Figure 2; Figure 4 represents a section through the tool head on the line 4—4 in Figure 1; Figure 5 represents a section on the line 5—5 in Figure 1; Figures 6 and 7 are detail views respectively of the pad-bolt and collet hereinafter mentioned; and Figure 8 illustrates a slightly modified collet.

In the drawing, 11 indicates a suitably shaped steel bar which constitutes the body or shank of the tool-holder, on the end of which is a cylindrical extension 12, on which extension is mounted a tool head 13, adjustable by swivelling on the extension. The said head is an approximately rectangular piece of steel, bored at 14 to receive the extension 12. In the same plane and parallel with the bored hole 14 is bored another hole 15 coned at its mouth to receive a split collet 16, the tail of which is screw threaded at 17 for engagement with a nut 18. The tool 20 is passed through the central bore of the collet; this tool is readily interchangeable, and may be adapted for boring, screw-cutting, recessing or other work as required. Transverse to the bores 14 and 15 is a bore 21 which partly cuts through the larger bore 14. A pad-bolt 22 is fitted into the bore 21, and is cut away at 23 to the radius of the extension 12 of the shank, so as to be a mating fit on the said shank. The upper end of the pad-bolt is screw threaded for engagement with a nut 24, and when the pad-bolt is drawn up by tightening the said nut, it has a strong locking action on the extension 12, thereby clamping the tool head very tightly on the said extension. Other clamping devices may be used for locking the tool head to the shank, but that just described is found to be very effective for the said purpose. A pin 25 may be provided having a screw threaded portion entering a tapped hole in the head 11, and a reduced end engaging a keyway or a longitudinal keyhole slot 26 in the collet 16, to ensure that no rotation of the collet takes place while the nut 18 being tightened upon the tail 17 of the collet to draw the collet against the coned part of the hole 15. The said slot may either terminate in a circular hole as in Figure 7, or in an elongated hole as in Figure 8.

In operation, a tool of the required shape is inserted into the collet; the tool head is then swivelled around the extension 12 of the shank to the approximate centre height; the tool is then rotated in the collet by hand until the required front cutting rake is obtained. The tool is now finally adjusted to its exact centre height by swivelling the tool head around the extension 12 to bring the point of the tool to the axis of the centres of the lathe heads. The clamping nut 24 is now tightened to cause the pad-bolt 22 to lock the tool head on the shank extension. The nut 18 is then tightened on the tail of the collet 16, causing the collet to grip the tool securely.

It will be apparent that the method of construction described has certain advantages, namely, no packing or tapered wedges are required to effect height adjustment of the tool, so that inclination of the shank, as in known previous tool-holders is effectively avoided, thus enabling the boring of fine holes of any depth to be successfully achieved; the tool being parallel to the lathe bed has no tendency to foul the mouth of the bore as would an inclined tool or tool-holder. Further, my method of construction provides for independent adjustment of the tool cutting edge for height and for cutting edge angle, each adjustment being made independent of the other. The locking means provide a very rigid support for the tool.

What I claim as my invention and desire to secure by Letters Patent of the United States is:

In a tool-holder, a shank having a cylindrical extension, a tool head having a bore to engage said extension rotatably, said tool head having also a bore transverse to said first named bore, a pad-bolt adjustable in said latter bore, said pad-bolt being cut away to the radius of the said extension to form a mating fit with said extension, means tending to draw said pad-bolt transversely to said extension to lock said extension in adjusted position, said tool head embodying a taper split collet to receive the tool and means to cause said collet to grip the tool.

HAROLD JONES.